United States Patent
Lawrenson et al.

(10) Patent No.: US 10,469,659 B2
(45) Date of Patent: Nov. 5, 2019

(54) METHOD AND DEVICE FOR SETTING UP A VOICE CALL

(71) Applicant: Telefonaktiebolaget LM Ericsson (publ), Stockholm (SE)

(72) Inventors: Matthew John Lawrenson, Bussigny (CH); Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 51 days.

(21) Appl. No.: 15/570,419

(22) PCT Filed: Jun. 1, 2015

(86) PCT No.: PCT/SE2015/050632
§ 371 (c)(1),
(2) Date: Oct. 30, 2017

(87) PCT Pub. No.: WO2016/195549
PCT Pub. Date: Dec. 8, 2016

(65) Prior Publication Data
US 2019/0058790 A1 Feb. 21, 2019

(51) Int. Cl.
*H04M 3/42* (2006.01)
*H04W 4/16* (2009.01)
*H04M 3/432* (2006.01)

(52) U.S. Cl.
CPC ... *H04M 3/42365* (2013.01); *H04M 3/42348* (2013.01); *H04M 3/432* (2013.01);
(Continued)

(58) Field of Classification Search
CPC .............. H04M 3/42; H04M 3/42348; H04M 3/42365; H04M 3/42374; H04M 3/432;
(Continued)

(56) References Cited

U.S. PATENT DOCUMENTS 5,872,841 A * 2/1999 King .................. H04M 3/432
379/205.01
8,194,837 B1 6/2012 Weinman
(Continued)

OTHER PUBLICATIONS

International Search Report for PCT International Application No. PCT/SE2015/050632, 5 pages (dated Feb. 4, 2016).
(Continued)

*Primary Examiner* — Harry S Hong
(74) *Attorney, Agent, or Firm* — Sage Patent Group

(57) ABSTRACT

The present invention relates to a method and a network device for setting up a voice call. The invention further relates to computer programs and computer program products comprising computer readable medium having the computer programs stored thereon. In a first aspect of the invention a method of setting up a voice call between a first party and a second party is provided. The method comprises acquiring information pertaining to at least one detected state of at least one of the first and the second party, determining whether the acquired information pertaining to the at least one detected state of the at least one of the first and the second party satisfies at least one criterion of a scheduling policy for setting up the voice call; and if so causing the voice call to be set up between the first party and the second party.

17 Claims, 9 Drawing Sheets

(52) U.S. Cl.
CPC .......... *H04W 4/16* (2013.01); *H04M 3/42374* (2013.01); *H04M 2203/2016* (2013.01); *H04M 2203/2072* (2013.01)

(58) Field of Classification Search
CPC . H04M 2203/2016; H04M 2203/2072; H04W 4/16
USPC .................................................... 379/201.01
See application file for complete search history.

(56) References Cited

U.S. PATENT DOCUMENTS

| | | | |
|---|---|---|---|
| 2003/0191676 A1* | 10/2003 | Templeton | G06Q 10/0631 705/7.19 |
| 2004/0002329 A1 | 1/2004 | Bhatia et al. | |
| 2006/0235994 A1* | 10/2006 | Wu | H04M 3/42374 709/238 |
| 2009/0041221 A1* | 2/2009 | Sherman | H04M 1/274575 379/210.01 |
| 2012/0057691 A1* | 3/2012 | Moran | H04M 3/42221 379/265.02 |

OTHER PUBLICATIONS

Written Opinion of the International Searching Authority for PCT International Application No. PCT/SE2015/050632, 5 pages (dated Feb. 4, 2016).

* cited by examiner

METHOD AND DEVICE FOR SETTING UP A VOICE CALL

CROSS REFERENCE TO RELATED APPLICATION

This application is a 35 U.S.C. § 371 national stage application of PCT International Application No. PCT/SE2015/050632 filed on Jun. 1, 2015, the disclosure and content of which is incorporated herein by reference in its entirety.

TECHNICAL FIELD

The present invention relates to a method and a network device for setting up a voice call. The invention further relates to computer programs and computer program products comprising computer readable medium having the computer programs stored thereon.

BACKGROUND

The use of voice calls is decreasing as many people favour other communication options, such as instant messaging. A difference between voice- and message-based communication is that all users need to participate in the process at the same time for voice communication, while this is optional for message-based communication. In fact, in many people's opinion message-based communication is favoured for this reason, as it does not place any requirements or restrictions on the other participant. As this opinion grows it may well be people become reluctant to use voice-based communication in order to avoid possible intrusion in the other participant's schedule.

However, whilst the use of voice-based communication is decreasing, many people feel that the level of interpersonal engagement is less for message-based communication, and hence a reduction in voice-based communication may exacerbate any existing feelings of loneliness.

If two people want to engage in a voice call, and ensure that the chosen time is convenient for both parties, then the current typical methods to organize the call are:
  Use a message based communication to schedule the call, or
  Schedule a regular call, perhaps with the use of a calendar or agenda to arrange/track the call times.
  Issues with these current methods include:
  While a certain scheduled time for setting up the voice call appeared to be convenient at the time of scheduling, subsequent occurring events may imply that that it is no longer so,
  Where a time appears to be convenient in the sense that it does not overlap with other activities, the time may not be the most appropriate for setting up a voice call in that one or both of the participants/parties may not be in the mood for a conversation at the scheduled time.

Thus a dilemma exists; while use of voice messaging may reduce loneliness, people are becoming increasingly reluctant to engage in a voice call. Hence, despite the fact that a second participant may be a willing participant in the process, this information is unknown to the first participant who is therefore reluctant to make the call.

SUMMARY

An object of the present invention is to solve, or at least mitigate, this problem in the art and to provide an improved method of setting up voice calls.

This object is attained in a first aspect of the invention by a method of setting up a voice call between a first part and a second party. The method comprises acquiring information pertaining to at least one detected state of at least one of the first and the second party, determining whether the acquired information pertaining to the at least one detected state of the at least one of the first and the second party satisfies at least one criterion of a scheduling policy for setting up the voice call; and if so causing the voice call to be set up between the first party and the second party.

This object is attained in a second aspect of the invention by a network device configured for setting up a voice call between a first party and a second party.

The network device comprises a processing unit and a memory, which memory contains instructions executable by the processing unit, whereby the network device is operative to acquire information pertaining to at least one detected state of at least one of the first and the second party, determine whether the acquired information pertaining to the at least one detected state of the at least one of the first and the second party satisfies at least one criterion of a scheduling policy for setting up the voice call, and if so cause the voice call to be set up between the first party and the second party.

The network device may be a mobile terminal of the first party, a mobile terminal of the second party, or a mobile terminal of the first party cooperating with a mobile terminal of the second party. For instance, the mobile terminal of the first party may detect a state of the first party, while the mobile terminal of the second party determines whether the criterion is fulfilled and subsequently sets up the call. Further, the network device may be implemented by an application server. The application server may interact with any one or both of the mobile terminal of the first party and the mobile terminal of the second party. In an example, the mobile terminal of the first party may detect a state of the first party, while the application server detects whether the criterion is fulfilled, and the mobile terminal of the second party subsequently sets up the call.

The network device is equipped with a communication interface and may be embodied in the form of an application server, a computer, a user equipment (UE) such as a smart phone, a tablet, a laptop, a media player, a smart watch, etc. The network device may implement applications, or apps, such as Skype, WhatsApp, Face Time, etc., for communication. When embodied as an application server, the network device may for instance be implemented as a Google+, Facebook, or WhatsApp service, i.e., provided as a social network service or integrated with a social network.

Advantageously, by taking into account a detected state of any one, or both, of a first and a second party between which a call is to be established, the setting up of the voice call is made when considered suitable according to a scheduling policy stipulating at least one criterion to which the detected state is compared, if the detected state satisfies the criterion.

For instance, a state in the form of a physical activity may be detected by detecting a particular movement of a mobile terminal of a first party, for example being a smart phone, tablet, laptop, media player, smart watch, etc. The first party may, e.g., cause her mobile terminal to move according to a known "signature" movement, i.e., a predetermined pattern of movement indicating that she wishes to receive a voice call from a second party.

As an alternative, a physical activity may also be an activity undertaken by the first party, such as a power walk, which is indicative of being appropriate for receiving a voice call. This user state is registered by the mobile terminal by means of, e.g., a built-in inertia measurement unit (IMU) and signalled to a device such as an application server or a mobile terminal of the second party.

Now, the detected activity is compared with one or more criteria of a scheduling policy either at the mobile terminal of the first party wishing to be called (i.e., the callee) or at the mobile terminal of the friend who is requested to make the call (i.e., the caller) to determine whether the detected activity satisfies the criteria of the scheduling policy required to set up the phone call. For instance, the criterion is considered to be satisfied if the IMU readings commensurate with the motion of the callee's gait when walking.

In this particular example, the movement caused by the callee performing the power walk is registered and compared to a predetermined movement pattern, and if there is a match, the criterion of the scheduling policy for setting up the call is considered to be satisfied, and the call is thus advantageously set up according to the scheduling policy. The scheduling policy may stipulate that the voice call is set up immediately upon determining that the user activity fulfils the scheduling criterion, or after a time period. For example, the callee may want to be called five minutes after the activity has started and the movement pattern satisfying the scheduling criteria is has been detected.

As will be described hereinbelow, in another embodiment of the invention, the setting up of the voice call may further, or alternatively, include taking into account a detected state of the caller, i.e., the second party.

Hence, when determining whether a voice call is to be set up between a caller and a callee, detected states of any one or both of the caller and the callee may advantageously be considered.

In an embodiment of the present invention, when setting up the call based on the scheduling policy, it is determined whether the scheduling policy stipulates whether a current time is a time when the callee wishes to be called and/or whether the current time is a time when the caller wishes to make a call. If so, the voice call is set up to the callee. For instance, the scheduling policy may stipulate that no calls should be set up on weekdays 09:00-17:00 as the callee is at work. As a further example, in case a call was just set up, a further call will not be set up for a given time period, even though the detected state of the callee and/or the caller satisfies the criterion. The scheduling policy is typically outlined by one or both of the participants in advance, for instance by noting in a calendar times which are not appropriate for setting up a voice call.

The scheduling policy may comprise a number of parameters stipulating whether a current time is appropriate for setting up a call to a callee, or whether the current time is suitable for the caller. For instance, the scheduling policy may comprise one or more of the following exemplifying parameters:
  i. A "Full Call Window", being a window of time in which the call(s) are to be made (e.g., a time period extending over one week),
  ii. A "Call Quantity", being the number of calls to be made within the Full Call Window (e.g., one call),
  iii. The "Call Window" being the Full Call Window divided by the Call Quantity (so for example if the Call Window was 4 weeks, and the Call Quantity 2 then the Call Window would be 2 weeks),
  iv. The "Window Repetition", being the number of times the Full Call Window is to be repeated (e.g., repeat 10 times),
  v. Disallowed call times (e.g., weekdays before 19:00, Fridays).

As should be understood from this example, the scheduling policy could be configured to comprise a complex and elaborate algorithm for determining whether a call should be set up.

In a further embodiment of the present invention, the detected state is a position or location of the callee and/or the caller. For instance, in order for a call to be set up, the callee/caller should advantageously satisfy criteria such as "the callee being at home", "the callee being located on public transport", etc.

In an embodiment of the present invention, the setting up of the voice call is automatically performed as stipulated by the scheduling policy of the calle with which the caller wishes to engage in a voice call, without any manual input from the caller. Thus, the mobile terminal of the caller automatically sets up a call with the mobile terminal of the callee in accordance with the scheduling policy. Alternatively, the caller may be presented with a notification, e.g., by an app used for voice communications or messaging, such as WhatsApp, Skype, or the like, that a callee has been identified. The notification may be visual or audible and may optionally request the user to confirm or decline setup of a call with the callee, e.g., by pressing a button.

In another embodiment of the present invention, implemented by an application server detecting a state of the first part and a state of the second party, both parties may be presented with a respective visual or audible notification that a call with another party is about to be setup, optionally identifying the other party. Optionally, each of the parties may be requested to confirm or decline setup of a call with the other party, e.g., by pressing a button.

In an embodiment of the invention, the detected state is a physical activity or a location/position of the first and/or the second party, which advantageously may be registered by a device already available in the mobile terminal of the respective party such as an IMU, a positional sensor, a microphone or a physiological sensor associated with the party, etc., wherein the activity is detected by analysing the recorded signal. It should be noted that the detected activity not necessarily relates to a movement of the mobile terminal, but could alternatively relate to non-movement of the mobile terminal. For instance, if the mobile terminal is still for a certain period, the scheduling criterion may be considered to be fulfilled and the call is set up in accordance with a current scheduling policy, since a party is more likely to be willing to receive a call if she is not engaged in some activity like travelling to/from work, playing tennis, or the like.

A modern smart phone (and other such similar devices) has multiple sensors able to estimate a state and/or current activity of a user. An assessment of sensor development indicates that the amount and accuracy of such sensors is likely to increase in the future, whilst their cost is likely to decrease.

Examples of sensors currently available and being developed include:
  IMUs: a modern smart phone now contains several sensors capable of assessing the movement of their host device. Examples of inertial sensors include accelerometers, gyroscopes and magnetometers. Such sensors can be used to assess activity such as walking, running, cycling etc.
  Positional sensors: sensors able to provide the location of the device include dedicated systems such as the Global Positioning System (GPS), but also the output of other systems, such as Wi-Fi, Bluetooth and IMUs can be used to gauge the current location of the device.

Physiological sensors: a more recent development in smart phone sensing is the ability to measure a physiological reading of the smartphone user. Current systems are able to measure things such as heart rate or blood pressure, but in the future systems may also include methods to measure electroencephalogram (EEG) states or electrocardiogram (ECG) states of the user, pupillary response, or other measurements able to provide an estimate of the user's mental state.

Microphones: some activities may be easily identified by sound, even specific acoustic signatures such as lighting a cigarette, being in a noisy environment, or the like.

These sensors often are provided with smart watches and other wearables, and their data is typically made available to the wearer's smart phone via wireless communication links, such as Bluetooth.

Hence, the state of the callee and/or the caller is detected by analysing the recorded signal of any of the above described sensor devices, in order to determine whether the detected state satisfies a criterion of a scheduling policy for scheduling the call according to the invention. Any sensor with the capacity to determine where the callee/caller is and/or what she is doing can be envisaged, where the above given sensors are examples thereof. It may even be envisaged that it is determined whether the callee/caller is in a particular room of her home, on public transport, in a taxi, etc.

In still a further embodiment of the present invention, the state of the callee and/or the caller is alternatively detected by detecting behaviour of the callee/caller utilizing one or more applications being executed on a mobile terminal.

For instance, the mobile terminal may advantageously be equipped with, e.g., a software component keeping track of a user's interaction with the mobile terminal, in particular tracking usage of software application ("apps"). As an example, if the user cycles between Facebook, Instagram and her Internet browser, this may indicate that the user is bored and very much would appreciate a voice call. Since such information is typically known by the operating system (OS) of the mobile terminal but not by individual apps, such a software component is most easily implemented in the OS of the device. Another example is that the user cycles between a few websites (for instance NY Times, Engadget, Financial Times, and then back to NY Times again), which is also an indication of boredom and hence that a friendly call is welcome. Again, since most users use the preinstalled browser, the software component is most easily incorporated into the OS/browser. Hence, this behaviour of the user is registered and the state of the user is consequently detected for determining whether it satisfies a criterion of a scheduling policy for setting up the voice call according to the invention.

Further embodiments of the invention will be discussed in the detailed description.

It should be noted that the scheduling policy may comprise a number of parameters for determining whether the call should be set up, given that detected state satisfies a criterion of the scheduling policy for scheduling the voice call, e.g., a time period during which calls can be made as agreed between the participants, maximum number of calls to be made during a period, repetition schedule, allowed/disallowed times (e.g., one call per week for the next 10 weeks, between 19.00 and 21.00, any day other than Fridays), etc.

Further, a number of criteria may need to be satisfied for a call to be set up. It can even be envisaged that different types of states of the user is detected. In an example, a call is set up if it is detected that all of the below criteria are satisfied:

(a) The callee is sitting still, i.e., a physical activity is detected,
(b) The callee is browsing her Facebook page, i.e., a user behaviour is detected, and
(c) The callee is at home, i.e., a user position or location is detected.

Further provided are computer programs for causing a network device or a system to perform the method according to the invention, and computer program products comprising computer readable medium having the computer programs stored thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The various aspects of the invention will now be described in greater detail in connection with a number of exemplifying embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

Figure 1:
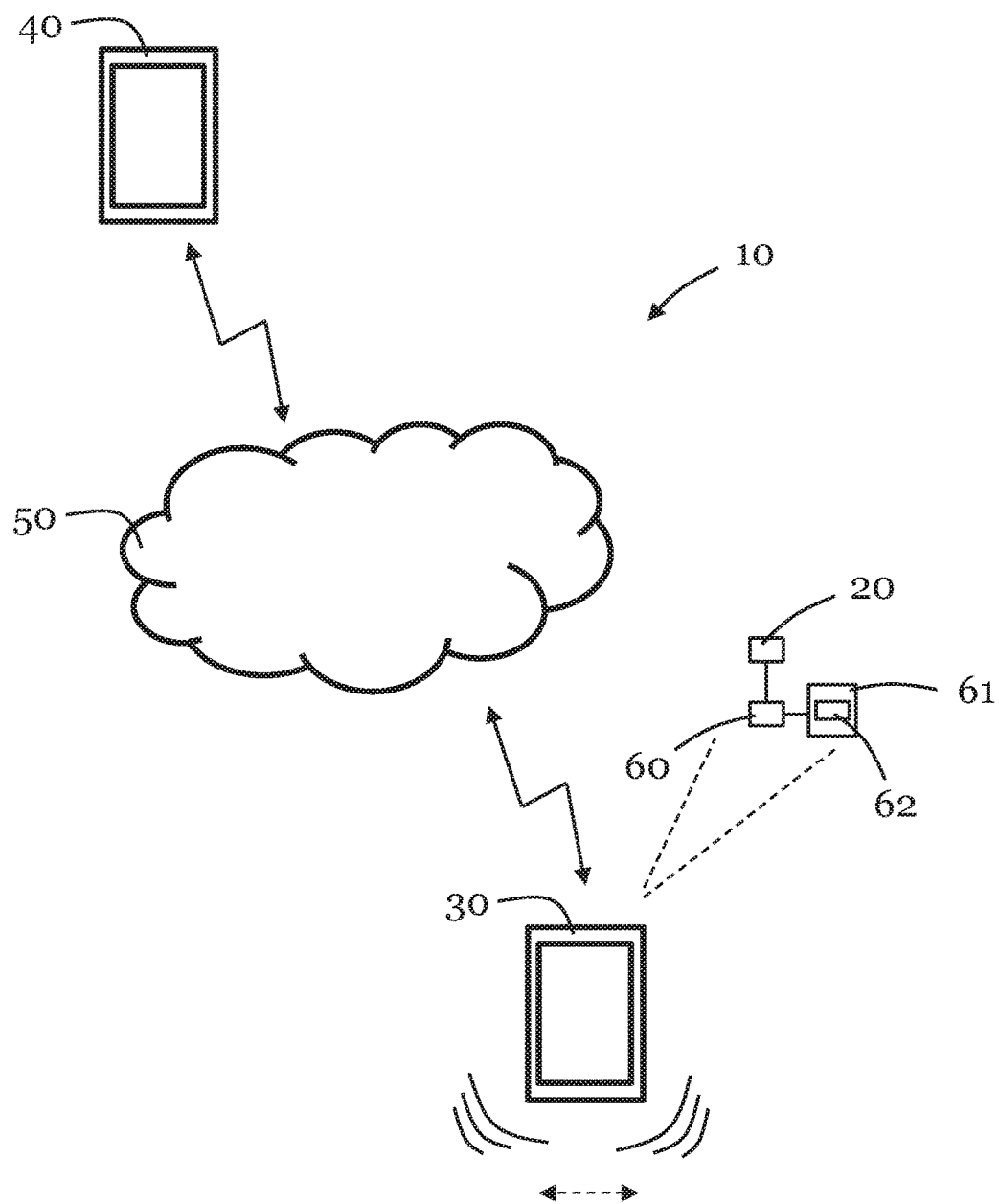
FIG. 1 illustrates a system in which an embodiment of the invention is implemented.

FIG. 1 illustrates a system 10 of network devices implementing an embodiment of the invention, in which, e.g., an IMU 20 of a mobile terminal 30 is used for detecting a state of a first party to which a voice call subsequently may be set up from a second party's mobile terminal 40 based on the detected state. The communication between the mobile terminal 40 of the second party—the caller- and the mobile terminal 30 of the first party—the callee—is effected over an appropriate network 50 such as for instance the Internet or a 3rd Generation Partnership Project (3GPP) telecommunications network. The voice call may be set up as a conventional telephone call via a Public Switched Telephone Network (PSTN), a Voice over IP (VoIP) call using Skype, a Voice over Long-Term Evolution (VoLTE) call, etc.

Figure 2:
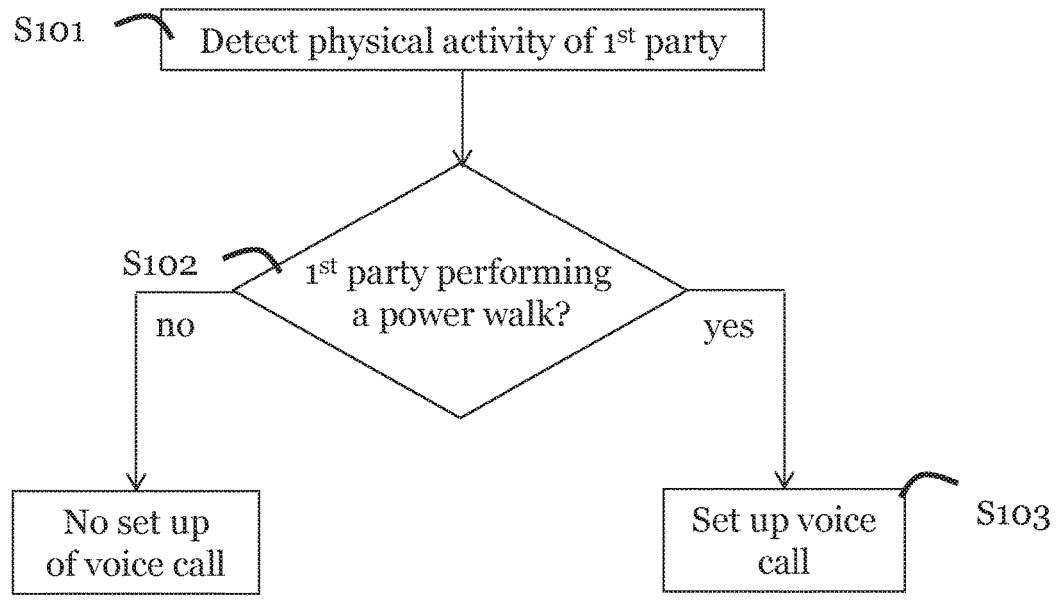
FIG. 2 illustrates a flowchart of a method for setting up a voice call, according to an embodiment of the invention.

FIG. 2 illustrates a flowchart of a method performed according to an embodiment of the invention for setting up a voice call. Reference will further be made to FIG. 1 for structural elements. In practice, the steps of the method performed by the mobile terminal 40, 30 of the caller and the callee, respectively, are caused by a processing unit 60 embodied in the form of one or more microprocessors arranged to execute a computer program 61 downloaded to a suitable storage medium 62 associated with the microprocessor, such as a Random Access Memory (RAM), a Flash memory or a hard disk drive. The processing unit 60 is arranged to cause the mobile terminal 30 to carry out the method according to embodiments of the present invention when the appropriate computer program 62 comprising computer-executable instructions is downloaded to the storage medium 61 and executed by the processing unit 60. The storage medium 61 may also be a computer program product comprising the computer program 62. Alternatively, the computer program 62 may be transferred to the storage medium 61 by means of a suitable computer program product, such as a Digital Versatile Disc (DVD) or a memory stick. As a further alternative, the computer program 62 may be downloaded to the storage medium 61 over a network. The processing unit 60 may alternatively be embodied in the form of a digital signal processor (DSP), an application specific integrated circuit (ASIC), a field-programmable gate array (FPGA), a complex programmable logic device (CPLD), etc.

Now, in a first step S101, a state of the callee to which a call is to be set-up is registered, in this particular embodiment by the IMU 20 measuring for example a physical activity of the callee such as a change in orientation of the callee's mobile terminal 30 caused by the callee being out on power walk, resulting in a particular and distinguishable movement of the callee's mobile terminal 30. For instance, a particular movement of mobile terminal 30 is measured by the IMU 20 and registered by the CPU 60, which indicates that now is an appropriate time for one of her friends to make a voice call.

It should be noted that detection of the state of the callee may be a complex process, where a number of measurements are made by the IMU 20 and recorded by the CPU 60. Thereafter, the CPU 60 analyses the recorded measurements in order to appropriately detect the activity of the callee.

In a second step S102, the detected state is compared with one or more criteria of a scheduling policy at the mobile terminal 30 of the callee to determine whether the detected state satisfies the criteria of the scheduling policy required to set up the voice call, in which case the mobile terminal 30 of the callee signals to the mobile terminal 40 of the caller over the network 50 that a call can be set up in accordance with the scheduling policy.

Alternatively, an indication of the detected state is transmitted by the mobile terminal 30 of the callee over the network 50 and received at the mobile terminal 40 of the caller where it is determined whether the detected state satisfies the criteria of the scheduling policy required to set up the voice call.

In this particular example, the change in orientation measured at the IMU 20 caused by the callee moving her mobile terminal 30 during the walk is registered and compared to a predetermined movement pattern, and is considered to match the predetermined pattern thereby satisfying the criterion of the scheduling policy for setting up the call.

In step S103, the mobile terminal 40 of the caller thus sets up the call to the mobile terminal 30 of the callee. Advantageously, by taking into account the registered state of the callee, the setting up of the voice call is made when considered suitable according to the scheduling policy associated with the criterion to which the registered user activity is compared, given that the activity satisfies the criterion.

As previously mentioned, even though the detected state of the callee satisfies the criterion of the scheduling policy for setting up the voice call, the scheduling policy may in itself comprise a number of parameters stipulating whether the call should be set up or not, e.g., a time period during which calls can be made as agreed between the participants, a maximum number of calls to be made during a period, a repetition schedule, allowed/disallowed times (e.g., one call per week for the next 10 weeks, between 19.00 and 21.00, any day other than Fridays), etc.

Figure 3:
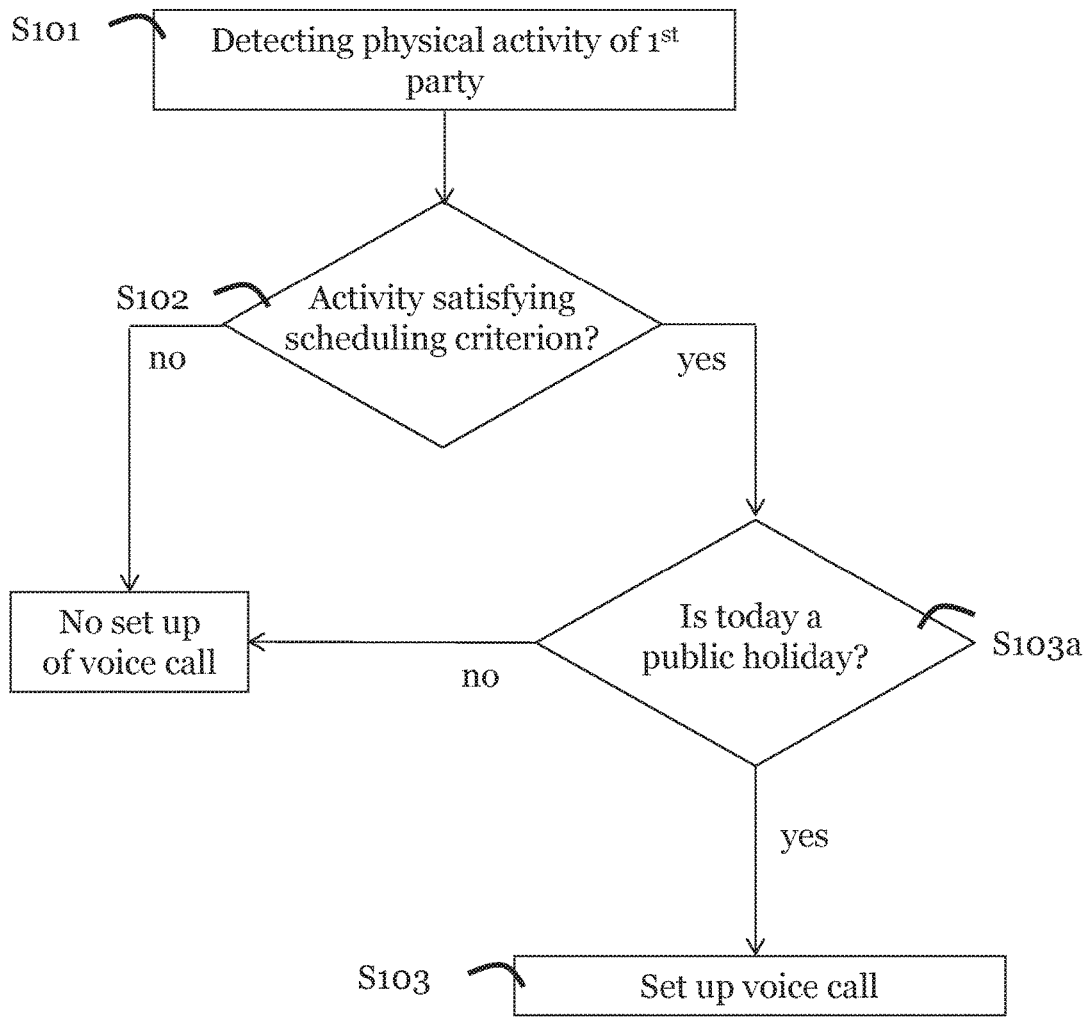
FIG. 3 illustrates a flowchart of a method for setting up a voice call, according to a further embodiment of the invention.

FIG. 3 illustrates a flowchart of a method performed according to a further embodiment of the invention for setting up a voice call, where such a parameter of the scheduling policy is taken into account. As in FIG. 2, in a first step S101, a state of the callee to which a call is to be set-up is registered, such as a physical activity, in this particular embodiment by the IMU 20 measuring a change in orientation of the callee's mobile terminal 30; a particular movement of mobile terminal 30 is measured by the IMU 20 and registered by the CPU 60, which indicates that now is an appropriate time for the callee to receive a voice call.

In a second step S102, the detected state is compared with one or more criteria of a scheduling policy at the mobile terminal 30 of the callee to determine whether the detected activity satisfies the criteria of the scheduling policy required to set up the voice call, in which case the mobile terminal 30 of the callee signals to the mobile terminal 40 of the caller over the network 50 that a call can be set up in accordance with the scheduling policy.

Now, in this particular embodiment, the scheduling policy stipulates that the callee only wishes to be called on a public holiday, given that the criterion is considered to be satisfied.

Hence, if it is determined in step S103*a* (by the mobile terminal 30 of the callee or alternatively by the mobile terminal 40 of the caller) that today indeed is a public holiday, the voice call is set up to the mobile terminal 30 of the callee in step S103. If not, no call is set up in accordance with the current scheduling policy, even if the criterion for setting up the call is considered to be satisfied. Possibly, a number of friends will receive a notification that the callee wishes to be called.

In this embodiment, the "public holiday"-parameter of the scheduling policy determining whether the call should be set up can be fetched from a calendar app of the callee and/or the caller. A number of parameters of the scheduling policy stipulating whether a call should be set up or not can be envisaged, such as learned behaviour ("callee is always at work weekdays between 9 and 17; calls are hence only set up outside of this time window"), information about public holidays ("calls can be set up on a weekday which is a public holiday, since the callee is not at work").

Further, a criterion to the effect that a call is more likely to be set up with an increasing time period since the last call can be included in the scheduling policy. This is advantageous since, if the caller for instance just talked to the callee for an hour, it is not likely that the callee would want a new call to be set up after another couple of minutes, even if a registered state of the callee indeed would satisfy a scheduling criterion. Further parameters that may be taken into account in the scheduling policy include, e.g., (a) level of success of previous calls between the participants that took place under similar circumstances, and (b) the "need" for the call, as determined by for instance an EEG sensors (e.g., if the objective of the call is to reduce the loneliness of one participant, then the algorithm can be modified to take into account the current loneliness of that participant as indicated by the EEG measurements). An EEG sensor records electrical activity of the brain along the scalp using electrodes. The recorded measurement can be evaluated to determine whether the user is active or not. Inactivity would indicate that the user is available for a voice call.

A number of parameters can be considered, where each parameter is given a weight and where a threshold value should be reached for the call to be set up. Hence, a scheduling policy may be implemented taking into account a great variety of parameters for determining whether a call should be set up to the callee in case the registered state satisfies a criterion of a scheduling policy.

Figure 4:
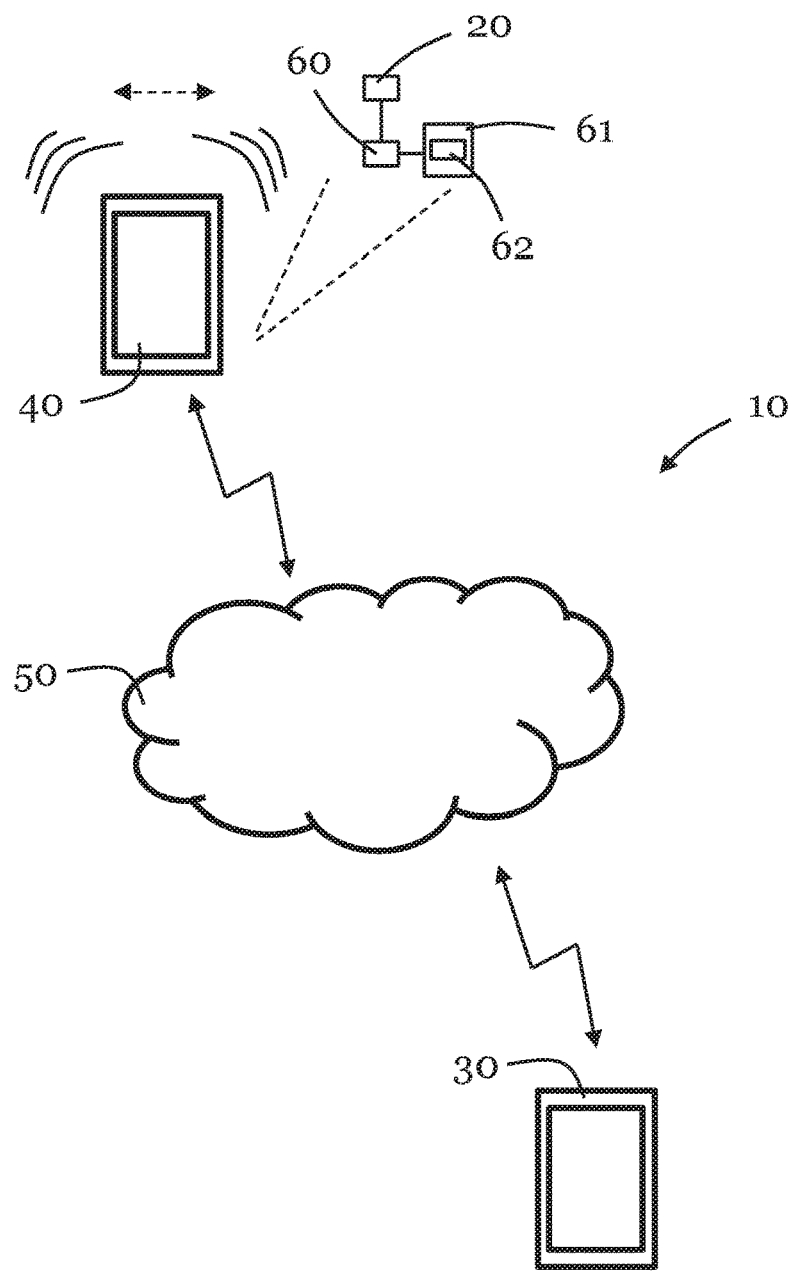
FIG. 4 illustrates a system in which a further embodiment of the invention is implemented.

FIG. 4 illustrates a system 10 implementing an alternative embodiment of the invention, in which, e.g., an IMU 20 of the mobile terminal 40 of the second party (i.e., the caller) is used for detecting a state of the caller in order for a call to subsequently be set up between the mobile terminal 40 of the caller and the mobile terminal 30 of the first party (i.e., the callee) over the network 50.

Figure 5:
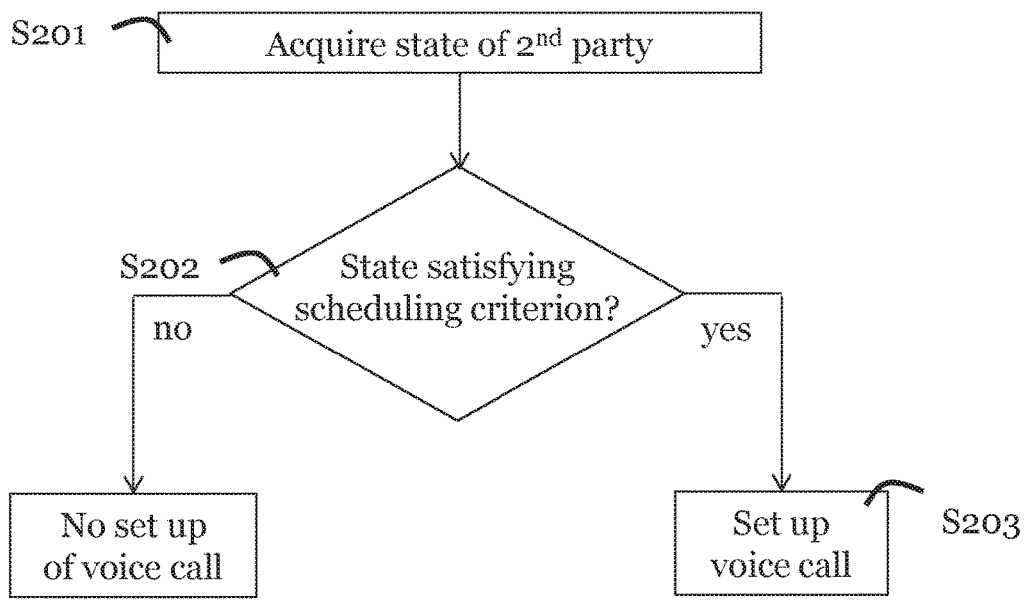
FIG. 5 illustrates a flowchart of a method for setting up a voice call, according to a further embodiment of the invention.

FIG. 5 illustrates a flowchart of a method performed according to the alternative embodiment of the invention for setting up a voice call. Reference will further be made to FIG. 4 for structural elements. In practice, the steps of the method performed by the mobile terminal 40, 30 of the caller and the callee, respectively, are caused by a processing unit 60 embodied in the form of one or more microprocessors arranged to execute a computer program 61 downloaded to a suitable storage medium 62 associated with the microprocessor, such as a Random Access Memory (RAM), a Flash memory or a hard disk drive. The processing unit 60 is arranged to cause the mobile terminal 30 to carry out the method according to embodiments of the present invention when the appropriate computer program 62 comprising computer-executable instructions is downloaded to the storage medium 61 and executed by the processing unit 60. The storage medium 61 may also be a computer program product comprising the computer program 62. Alternatively, the computer program 62 may be transferred to the storage medium 61 by means of a suitable computer program product, such as a Digital Versatile Disc (DVD) or a memory stick. As a further alternative, the computer program 62 may be downloaded to the storage medium 61 over a network. The processing unit 60 may alternatively be embodied in the form of a digital signal processor (DSP), an application specific integrated circuit (ASIC), a field-programmable gate array (FPGA), a complex programmable logic device (CPLD), etc.

Now, in a first step S201, information pertaining to a state of the caller is acquired, in this particular embodiment by the IMU 20 measuring for example a physical activity of the caller such as a change in orientation of the caller's mobile terminal 40. For instance, a particular movement of mobile terminal 40 is measured by the IMU 20 and detected by the CPU 60, which indicates that the caller is engaged in an activity during which she would consider it appropriate to make a voice call to one of her friends.

In a second step S202, the detected state is compared with one or more criteria of a scheduling policy at the mobile terminal 40 of the caller (or in, e.g., an application server) to determine whether the detected state satisfies the criteria of the scheduling policy required to set up the voice call, so that a call can be set up in accordance with the scheduling policy between the mobile terminal 40 of the caller and the mobile terminal 30 of the callee over the network 50.

In this particular example, the change in orientation measured at the IMU 20 caused by the caller performing a particular activity is registered and compared to a predetermined movement pattern, and is considered to match the predetermined pattern thereby satisfying the criterion of the scheduling policy for setting up the call.

In step S203, the mobile terminal 40 of the caller thus sets up the call to the mobile terminal 30 of the callee. Advantageously, by taking into account the detected state of the caller, the setting up of the voice call is made when considered suitable according to the scheduling policy associated with the criterion to which the registered user activity is compared, given that the activity satisfies the criterion.

As was described with reference to FIG. 3, a further embodiment may comprise the step of determining whether the scheduling policy stipulates that a current time is a time when the caller indeed wishes to make a call.

Figure 6:
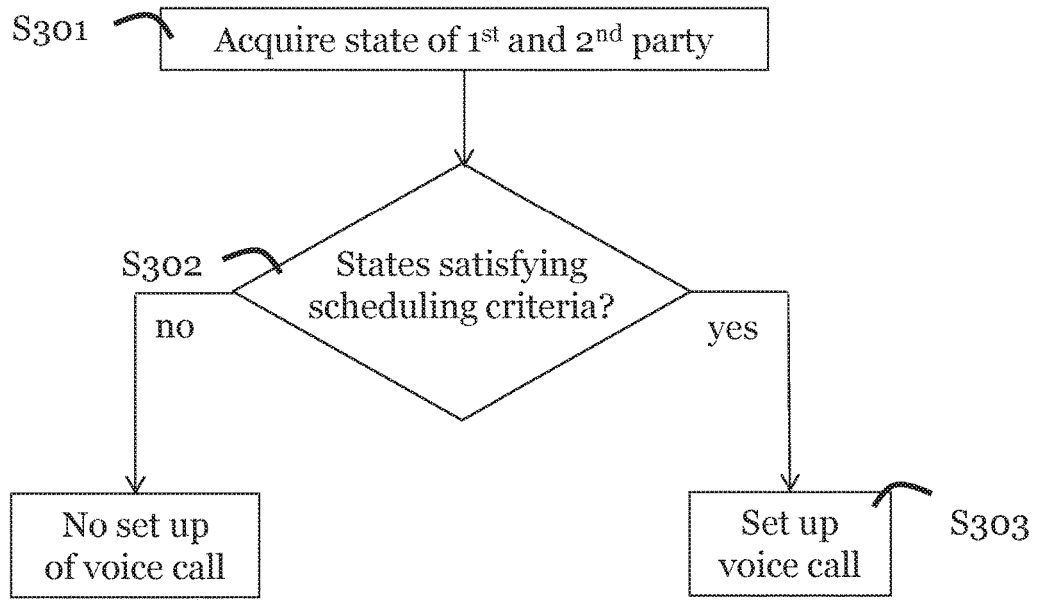
FIG. 6 illustrates a flowchart of a method for setting up a voice call, according to yet a further embodiment of the invention.

FIG. 6 illustrates a flowchart of a method performed according to yet another embodiment of the invention for setting up a voice call. In this particular embodiment, a state of the callee (i.e., the first party) as well as a state of the caller (i.e., the second party) is taken into account for setting up a voice call between the mobile terminal 40 of the caller and the mobile terminal 30 of the callee.

Now, in a first step S301, information pertaining to a state of the callee is acquired, in this particular embodiment by a pulse sensor measuring the heart rate of the callee at the mobile terminal 30. Further, information pertaining to a state of the caller is acquired, in this particular embodiment by a positional sensor measuring the location of the mobile terminal 40 of the caller.

In a second step S302, the detected state of the callee is compared to a 100 criterion of the scheduling policy to determine whether the detected activity satisfies the criteria of the scheduling policy required to set up the voice call. Hence, if the pulse measurements indicate that the callee is calm and relaxed, the criterion is considered to be satisfied, and a call can be set up according to the scheduling policy.

Moreover, in the second step S302 the detected state of the caller is compared to a criterion of the scheduling policy to determine whether the detected activity satisfies the criteria of the scheduling policy required to set up the voice call. Hence, if the positional sensor measurements indicate that the caller is in a designated location, such as in her car, the criterion is considered to be satisfied and a call can be set up according to the scheduling policy.

In step S303, the mobile terminal 40 of the caller thus sets up the call to the mobile terminal 30 of the callee. Possibly, parameters of the scheduling policy, such as calendar events, are taken into account as described with reference to FIG. 3 for determining whether timing is good for setting up the call. Advantageously, by taking into account the states of the callee as well as the caller, the setting up of the voice call is made when considered suitable according to the scheduling policy from the perspective of both the callee and the caller.

Optionally, the caller, the callee, or both, may be presented with a notification, e.g., by an app such as WhatsApp or Skype, that a call is about to be set up. The caller and/or the callee may then, in response to the notification, take an action to so as to confirm that they are willing to engage in a call, or decline. If one of the caller and the callee declines, the call is not initiated. The notification may be visual or audible. As an alternative, the caller and/or the callee may be notified that the call is set up after a certain time period, e.g., five seconds, unless the caller or the callee declines the call.

Figure 7:
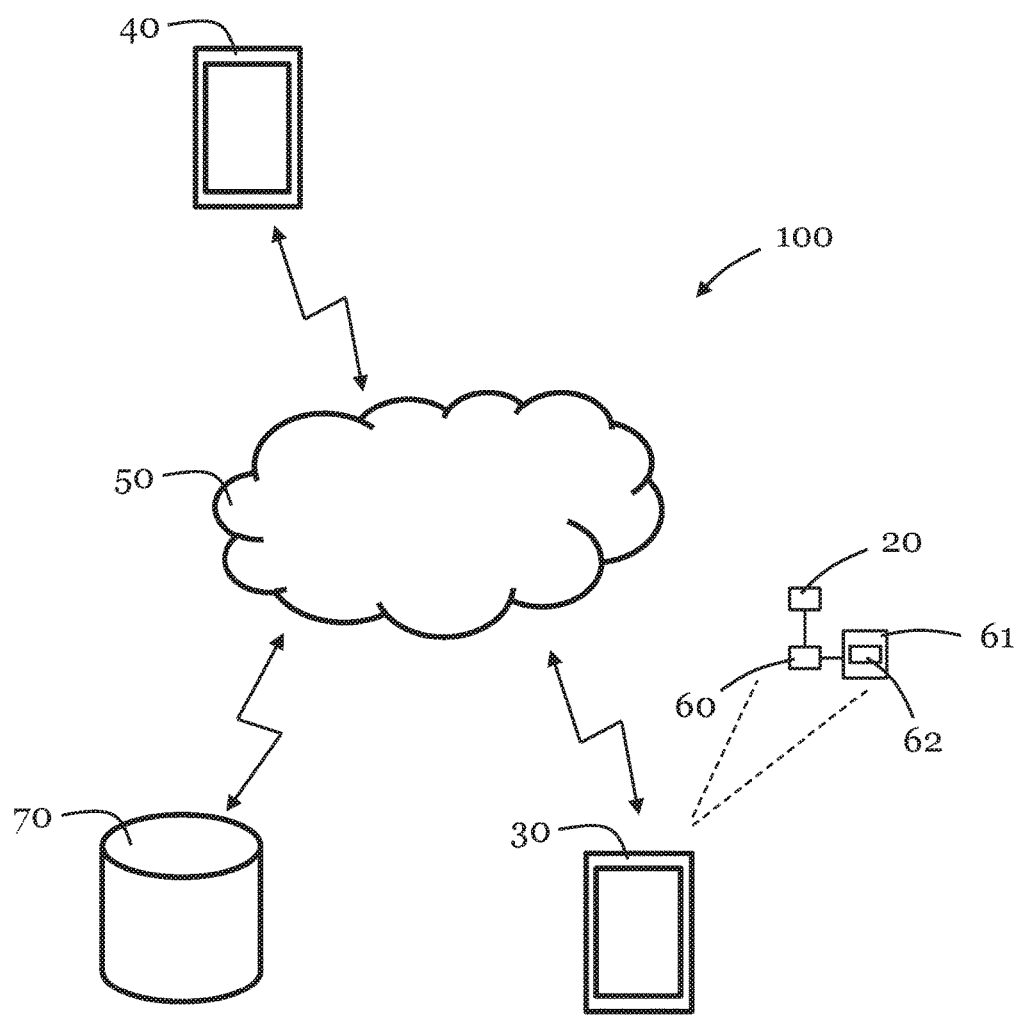
FIG. 7 illustrates a system in which still a further embodiment of the invention is implemented.

FIG. 7 illustrates a system 100 in which a further embodiment of the invention is implemented, in which information pertaining to the detected state is transmitted by the mobile terminal 30 of the first party (i.e., the callee) over the network 50 to an application server 70 where it is determined whether the detected state satisfies the criteria of the scheduling policy required to set up the voice call, in which case the server 70 communicates to the mobile terminal 40 of the second party (i.e., the caller) that the call can be set up, and the call is set up to the mobile terminal 30 of the callee as previously described with reference to FIG. 2. Alternatively, the server 70 sets up the voice call between the mobile terminals 30, 40 using for instance technology such as an IP Multimedia Subsystem (IMS).

Hence, with reference to the systems 10, 100 of FIGS. 2 and 4, respectively, if a state in the form of physical activity of the callee is to be detected, such physical activity is detected by an IMU 20, a positional sensor, a microphone, a physiological sensor, etc., of the mobile terminal 30 of the callee, while the determination whether the detected activity satisfies a criterion of a scheduling policy for setting up the voice call from the mobile terminal 40 of the caller may be undertaken at any one of the mobile terminal 30 of the callee, the mobile terminal 40 of the caller, or the server 70.

A number of detected states may be envisaged for determining whether a current time is an appropriate time for setting up a voice call using a microphone, e.g., to determine that a party is flicking through TV stations (an indication of boredom), detection of the lighting of a cigarette (an indication of availability), etc.

A method performed according to a further embodiment of the invention for setting up a voice call will be described with reference to FIG. 7. In this particular embodiment, a state of a callee is detected in the form of a usage behavior of the callee when utilizing one or more applications of her mobile terminal, rather than a physical activity or a particular location/position. For instance, the callee cycling between different apps such as Facebook, Instagram and her Internet browser, setting her WhatsApp status to "available", starting a particular app, pressing a button on her phone, etc., may indicate that the she is bored and would appreciate a voice call.

Such behavioural activity may either be detected by the server 70, or the mobile terminal 30 of the callee may be configured for keeping track of the callee's interaction with the mobile terminal 30, in particular tracking usage of apps. Since such information typically is known by the OS of the mobile terminal, a software component tracking usage of apps is most easily implemented by the OS manufacturer of the device.

Again, the activity ("switching between different apps") is detected by the mobile terminal 30, or the server 70 (or any other appropriate network node having the capability to analyse network traffic originating from the mobile terminal 30 to detect the activity), and it is determined whether the detected activity satisfies a criterion of a scheduling policy for setting up the voice call. For instance, the criterion to be satisfied may be formulated as "switching between at least 10 apps during a period of 10 minutes", and if so, the call is set up between the mobile terminal 40 of the caller and the mobile terminal 30 of the callee according to the scheduling policy (e.g., "set-up the call if it is Saturday" AND "no call has been set up with the callee during the last five days").

In still an embodiment of the present invention, if it is determined that a call should be set up, the mobile terminal 40 of the caller automatically sets up a call with the mobile terminal 40 of the caller (possibly by indicating in advance on the display to the caller that a call indeed will be set up). Alternatively, an app of the mobile terminal 40, such as FaceTime, Skype, WhatsApp, etc, will indicate to the caller that a call can be made.

With reference again to FIG. 1, an algorithm for determining whether one or more criteria is satisfied in order for a call to be set up according to a scheduling policy will be described.

Thus, the CPU 60 may run a set of algorithms 62 stored in memory 61, which are able to take data collected from the sensor 20 as an input and determine the state of the user of the mobile terminal 30, and if appropriate a quantitative measure of that state, in one or more categories such as current activity being undertaken, mood, location etc. The output of this algorithm is a set of parameters that describe the various states of the user, which are typically stored in the memory 20. The algorithm may operate as follows:

i. Various user states may be given scores using for example a scale of 0 to 10. For example, if "tiredness" is a user state that is to be detected, then the state may range from S=0 (extremely tired) to S=10 (not tired at all), as measured by an EEG sensor.

A further user state that is to be detected may be "physical activity", where S=0 would be given for a state where the user is running (and is not likely to want to receive a call), while S=10 would be given for a state where the user is still (and is likely to want a call), for instance at home in her sofa, as measured by an IMU.

A total score (TS) could then for instance be expressed as the sum of the individual scores, where 20 would indicate that the user is 1) completely still and 2) wide-awake, thereby wishing to receive a call.

ii. The total score TS is compared to a threshold value of, for example, T=10. If TS>T, the detected user state (in this example a combination of two user states: "tiredness" and "physical activity") is considered to satisfy the scheduling criterion, and a call would be set up between the mobile terminal 40 of the caller and the mobile terminal 30 of the callee, given that the scheduling policy stipulates that a current time is appropriate for making the call.

In a further embodiment, the threshold value T is weighted with a factor (ranging from for instance 0.1 to 1) indicative of the time that has elapsed since the last call was set up to the callee. In this embodiment, the threshold value T is decreased by the factor the longer the elapsed time is since the last call was made, advantageously having the effect that a user state is more likely to satisfy the scheduling criterion if a long period of time has elapsed since the last call. Hence, with the weighting factor, the threshold value T is set to decrease linearly over a time period since the last call was set up. For instance, the weighting factor w could be calculated as w=1/(t_now−t_last_call), where t_now−t_last_call e.g is measured in full days. Hence, T will decrease as the time elapsed since the last call increases. It should be noted that many different algorithms may be envisaged for determining an appropriate weighting factor.

As previously has been mentioned, a number of sensors may be used for embodying the sensor 20, for instance an IMU for measuring physical activity, location or position of a user, an EEG or ECG sensor for measuring a physiological state of the user, or a software-based component for measuring the behaviour of the user when managing various apps on her mobile terminal 30, such as the user's behaviour when browsing various Internet sites. Hence, with the proposed sensors, a number of different user states can be detected for determining whether a call should be set up to the user. A number of examples will be given hereinbelow.

1. Activity user state: IMUs within a modern smartphone allow the determination of certain motion-based activities. Examples of IMUs include accelerometers, gyroscopes and magnetometers. The motion detected by these sensors are compared to predetermined "signatures" to see if the current motion matches that which occurs when the user is, e.g., walking, jogging, cycling, etc. Where "patterns" of motion are assessed, it may be possible to ascertain if the person is playing a certain sport such as football, or if she is causing a deliberate movement of her mobile terminal to indicate that she wishes to be called. Other activities have distinct signals other than motion. For example, the sounds plus an analysis of the "echo" of those sounds may indicate that a person is bathing their children in the bathroom, another example would be a combination of odour and acoustic sensors detecting when a person is cooking. Further, she may indicate in an app such as Lync or WhatsApp that she likes to talk, in response to which the invention finds someone to call her.

2. Emotional user state: a possible measure of whether a person is experiencing positive emotions or negative emotions is to measure the asymmetry of brain signals in the user's left and right side of their brain. Hence, if the sensor being used is an EEG sensor it may be possible to discern happy emotions from sad emotions.

3. Cognitive user state: where a user is wearing an EEG sensor and has a low signal of so called alpha waves, it may be an indication that the user is being attentive to a stimulus (i.e., concentrating). A second method to estimate cognitive state is through the use of pupillary response—whereby task-evoked pupillary response (i.e., the change of a person's pupil size when undertaking a task) can be used to estimate her "cognitive load". Thus, if the user is wearing a sensor able to measure the changes in size of her pupils to a certain accuracy, then information about her cognitive state (e.g., the amount of concentration they are undertaking) can be obtained. The measurement of a user's pupils may give an indication as to whether the user is mentally stimulated, and performing tasks. If these signs are not present, it may be an indication that the user is inactive—and possibly bored and/or lonely. The user may thus be considered to be available for a call.

Figure 8:
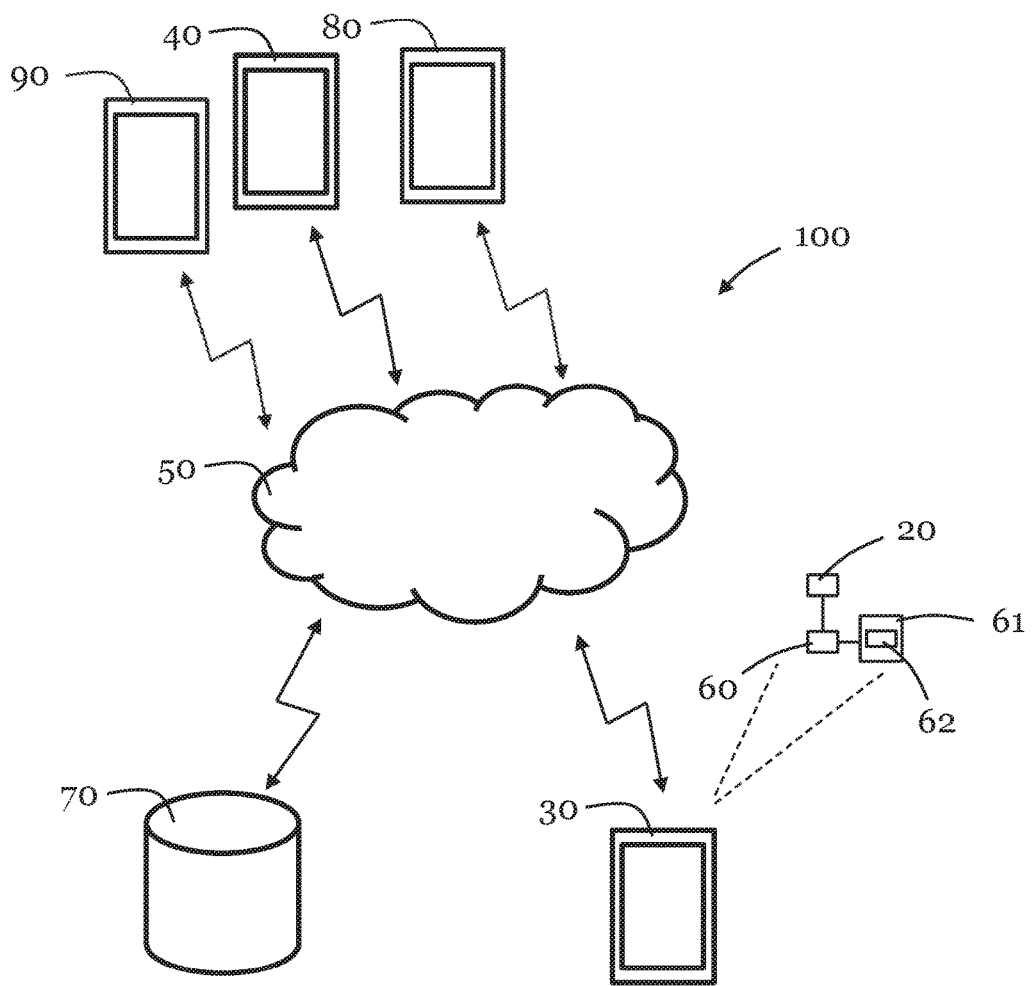
FIG. 8 illustrates a system in which yet a further embodiment of the invention is implemented.

FIG. 8 illustrates a system 100 according to a further embodiment of the invention, where a callee associated with the mobile terminal 30 indicates that she wishes to be called by any one of a number of second parties associated with mobile terminals 40, 80 and 90, respectively. These second parties are typically friends which, for instance, may be identified via the callee's phone book or via a social media network such as Facebook. In this particular embodiment, a state of the callee to which a call is to be set-up is detected for instance by an EEG sensor 20 of the callee's mobile terminal 30 registering a level of tiredness of the callee.

In this particular embodiment, if it is detected by the EEG sensor 20 that the callee is alert and ready for a call (i.e., that a criterion of the scheduling policy of the callee is satisfied), a state of each of the potential callers associated with the mobile terminals 40, 80 and 90 is detected by a respective sensor (not shown).

The state of each of the potential callers is then compared to a criterion of a scheduling policy associated with each potential caller, and if any one of the states satisfies the criterion, a call can be set up with one of the potential callers. If for instance a corresponding state of "tiredness" is detected, the potential caller being "least tired" is selected for setting up the call, if the scheduling policy allows for a call to be set up. This may for instance be determined by assigning a score to the respective state as previously has been discussed and selecting the potential caller having the highest score. Hence, assuming that the caller of mobile terminal 40 has a score of S=3, the caller of mobile terminal 80 has a score of S=7, and the caller of mobile terminal 90 has a score of S=4, the caller of mobile terminal 80 will be selected to set up the call to the callee, given that the scheduling policy allows for a call to be set up. Such determination may be performed by the server 70.

It should be noted that even though the detected state of the callee and the caller associated with the mobile terminal 80 satisfies their respective criterion of the scheduling policy for setting up the voice call, the scheduling policy may in itself comprise a number of parameters stipulating whether the call should be set up or not, e.g., a time period during which calls can be made as agreed between the participants. Hence, in case the scheduling policy of the caller of the mobile terminal 80 does not allow a call to be set up, the next-best potential caller associated with the mobile terminal 90 will be selected, and so on.

Figure 9:
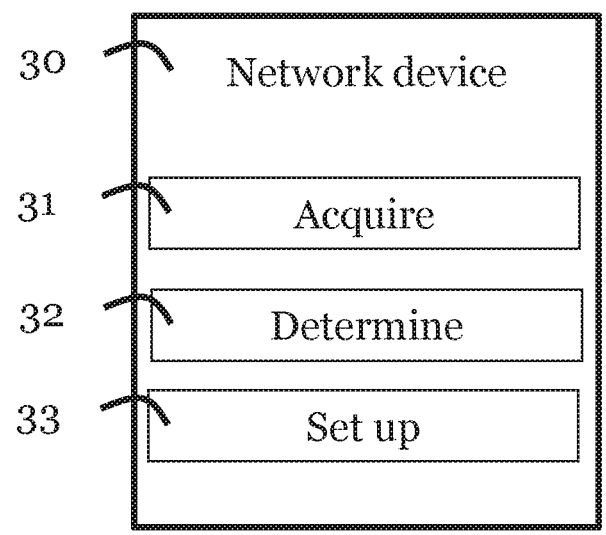
FIG. 9 shows a network device configured for setting up a voice call between a first party and a second party, according to an embodiment of the invention.

FIG. 9 shows a network device 30 configured for setting up a voice call between a first party and a second party according to an embodiment of the invention. The network device 30 comprises acquiring means 31 adapted to acquire information pertaining to at least one detected state of at least one of the first and the second party, determining means 32 adapted to determine whether the acquired information pertaining to the at least one detected state of the at least one of the first and the second party satisfies at least one criterion of a scheduling policy for setting up the voice call. Further, the network device 30 comprises means 33 adapted to cause the voice call to be set up between the first party and the second party. The acquiring means 31, the determining means 32 and the set up means 33 may comprise a communications interface for receiving and providing information, and further a local storage for storing data. The acquiring means 31, determining means 32 and set up means 33 may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a network device of setting up a voice call between a first party and a second party, comprising:
acquiring information pertaining to at least one detected state of at least one of the first and the second party, wherein the at least one detected state is detected based on a usage behavior of at least one of the first and the second party utilizing one or more software applications being executed on a mobile terminal operated by the at least one of the first and the second party, wherein the usage behavior comprises at least one of the first party and the second party cycling between different applications or different websites on the mobile terminal;
determining whether the acquired information pertaining to the detected at least one state of the at least one of the first and the second party satisfies at least one criterion of a scheduling policy for setting up the voice call; and
responsive to determining the acquired information pertaining to the detected at least one state of the at least one of the first and second party satisfies the at least one criterion, causing the voice call to be set up between the first party and the second party.

2. The method according to claim 1, wherein the acquiring of information comprises:
acquiring information pertaining to at least one detected state of the first party and to at least one detected state of the second party; wherein determining whether the acquired information pertaining to the detected at least one state of the at least one of the first and the second party satisfies at least one criterion comprises:
determining whether the acquired information pertaining to the at least one state of the first party satisfies the at least one criterion of the scheduling policy for setting up the voice call and whether the acquired information pertaining to the at least one state of the second party satisfies the at least one criterion of the scheduling policy for setting up the voice call.

3. The method according to claim 1, wherein determining whether the acquired information pertaining to the detected at least one state of the at least one of the first and the second party satisfies at least one criterion further comprises:
determining whether the scheduling policy stipulates that a current time is a time when the first party wishes to be called and/or a time when the second party wishes to make a call.

4. The method according to claim 1, wherein the at least one detected state is assigned a score and is considered to satisfy said at least one criterion if the assigned score complies with a score threshold.

5. The method according to claim 1, wherein the determination of whether the acquired information satisfies the at least one criterion is configured to increase a likelihood for the voice call being set based on an increase in a time period that has elapsed since the first party and the second party last were in contact with each other.

6. The method according to claim 1, wherein acquiring the information comprises acquiring information pertaining to at least one detected state of each of a plurality of selected second parties with which the voice call may be set up;
wherein determining whether the acquired information pertaining to the detected at least one state of the at least one of the first and the second party satisfies at least one criterion comprises determining whether the acquired information pertaining to the at least one detected state of each of the plurality of selected second parties satisfies at least one criterion of a scheduling policy for setting up the voice call; and
wherein causing the voice call to be set up comprises causing the voice call to be set up between the first party and a selected one of the plurality of second parties satisfying the criterion responsive to determining that the acquired information pertaining to the at least one detected state of each of the plurality of selected second parties satisfies the at least one criterion of the scheduling policy for setting up the voice call.

7. A computer program product comprising a non-transitory medium storing computer-executable instructions for causing a device to perform steps recited in claim 1 when the computer-executable instructions are executed on a processor included in the device.

8. A network device configured for setting up a voice call between a first party and a second party, the network device comprising a processing unit and a memory, said memory containing instructions executable by said processing unit, whereby said network device is operative to:
acquire information pertaining to at least one detected state of at least one of the first and the second party, wherein the at least one detected state is detected based on a usage behavior of at least one of the first and the second party utilizing one or more software applications being executed on a mobile terminal operated by the at least one of the first and the second party, wherein the usage behavior comprises at least one of the first party and the second party cycling between different applications or different websites on the mobile terminal;
determine whether the acquired information pertaining to the at least one detected state of the at least one of the first and the second party satisfies at least one criterion of a scheduling policy for setting up the voice call; and
cause the voice call to be set up between the first party and the second party in response to the determination the acquired information pertaining to the detected at least one state of the at least one of the first and second party satisfies the at least one criterion.

9. The network device according to claim 8, said at least one network device being a mobile terminal of the first party, of the second party, or of both parties.

10. The network device according to claim 8, said at least one network device being an application server.

11. The network device according to claim 8, further being operative to, when acquiring information:
   acquire information pertaining to at least one detected state of the first party and to at least one detected state of the second party; and being operative to, when determining whether the acquired information pertaining to the detected at least one state of the at least one of the first and the second party satisfies at least one criterion:
   determine whether the acquired information pertaining to the at least one state of the first party satisfies the at least one criterion of the scheduling policy for setting up the voice call and whether the acquired information pertaining to the at least one state of the second party satisfies the at least one criterion of the scheduling policy for setting up the voice call.

12. The network device according to claim 8, further being operative to, when causing the voice call to be set up:
   determine whether the scheduling policy stipulates that a current time is a time when the first party wishes to be called and/or a time when the second party wishes to make a call.

13. The network device according to claim 8, further being operative to assign to the detected state a score, wherein the detected state is considered to satisfy said at least one criterion if the assigned score exceeds a score threshold.

14. The network device according to claim 13, wherein a likelihood for the voice call being set up increases with a time period that has elapsed since the first party and the second party last were in contact with each other.

15. The network device according to claim 8, further being operative to:
   acquire the information by acquiring information pertaining to at least one detected state of each of a plurality of selected second parties with which the voice call may be set up;
   determine whether the acquired information pertaining to the at least one detected state of the at least one of the first and the second party satisfies at least one criterion by determining whether the acquired information pertaining to the at least one detected state of each of the plurality of selected second parties satisfies at least one criterion of a scheduling policy for setting up the voice call; and
   cause the voice call to be set up by causing a voice call to be set up between the first party and a selected one of the plurality of second parties satisfying the criterion according to the scheduling policy in response to the determination that the acquired information pertaining to the at least one detected state of each of the plurality of selected second parties satisfies the at least one criterion of the scheduling policy for setting up the voice call.

16. The method according to claim 1, further comprising:
   detecting the at least one detected state based on the usage behavior of the at least one of the first and the second party utilizing one or more software applications being executed on the mobile terminal operated by the at least one of the first and the second party.

17. The network device according to claim 8, further being operative to detect the at least one detected state based on the usage behavior of the at least one of the first and the second party utilizing one or more software applications being executed on the mobile terminal operated by the at least one of the first and the second party.

* * * * *